United States Patent [19]
Liming et al.

[11] 3,739,373
[45] June 12, 1973

[54] TIMER CONTROL FOR TRAP RELEASE

[76] Inventors: Eugene H. Liming, Box 455, Oceola, Ohio 44860; Robert E. Heffelfinger, 916 Monnett St., Cucyrus, Ohio 44820

[22] Filed: Jan. 7, 1972

[21] Appl. No.: 216,208

[52] U.S. Cl. .................. 340/309.1 R, 340/309.4 R
[51] Int. Cl. ............................................. G08b 5/00
[58] Field of Search ................... 340/309.1, 323 R, 340/332 R

[56] References Cited
UNITED STATES PATENTS
3,488,558   1/1970   Grafton .......................... 340/332 X Primary Examiner—Harold I. Pitts
Attorney—Harvey B. Jacobson

[57] ABSTRACT

An automatic trap release system is provided for timed release of a target trap upon completion of a predetermined time delay interval subsequent to the automatic actuation of a signal to the shooter. As such, each competitive shooter will be afforded the same warning or ready signal followed by automatic release of the trap in the same time interval thereafter.

13 Claims, 4 Drawing Figures

Patented June 12, 1973

TIMER CONTROL FOR TRAP RELEASE

The present invention is generally related to the sport of shooting and, more particularly, to an automatic trap release control to assure fairness to each competing shooter.

In the sport of trap shooting, the shooter's timing is a prime factor in the success or failure of each shot. Each shooter must adjust to the time interval between the "pull" command to release the trap and the actual release. In conventional trap shooting systems it was necessary that an individual referred to as the "puller" released the trap by push button or similar means after the command had been given. Often, the puller did not hear the command or, for some other reason, either delayed or hurried the release, adversely affecting the shooter's timing. It will be appreciated that under the strain of competition, such erratic releases can be most frustrating to a shooter, often causing unnecessary misses and adversely affecting his score.

While systems have been proposed for automatic trap release and for random timing of each release, such systems have not provided the shooters with adequate means of knowing when the trap is going to be released. Therefore, it is desirable to provide a release control which automatically releases the trap upon completion of a predetermined time delay interval subsequent to a signal given to the shooter, such that each shooter is exposed to the same time delay interval, thereby providing ultimate fairness to each competitor.

It is an object of the present invention to provide a novel timing control for automatic trap release a predetermined time interval after a signal has been given to the shooter, such that each shooter may be accustomed to the time delay interval and more accurately anticipate release of the trap.

Another object of the present invention is to provide a unique control assembly including a light or similar signal in the vicinity of the trap and within the shooter's field of perception to indicate to him when the time delay interval has been initiated in order that he may accurately anticipate release of the trap each turn.

It is a further object of the present invention to provide a versatile trap release control assembly including a remote switch which may be operated by a scorer to initiate an automatic timing cycle for release of a trap and including means which permit shut-off to prevent release of the trap, yet permitting the timer to complete its cycle to condition it for a subsequent trap release.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
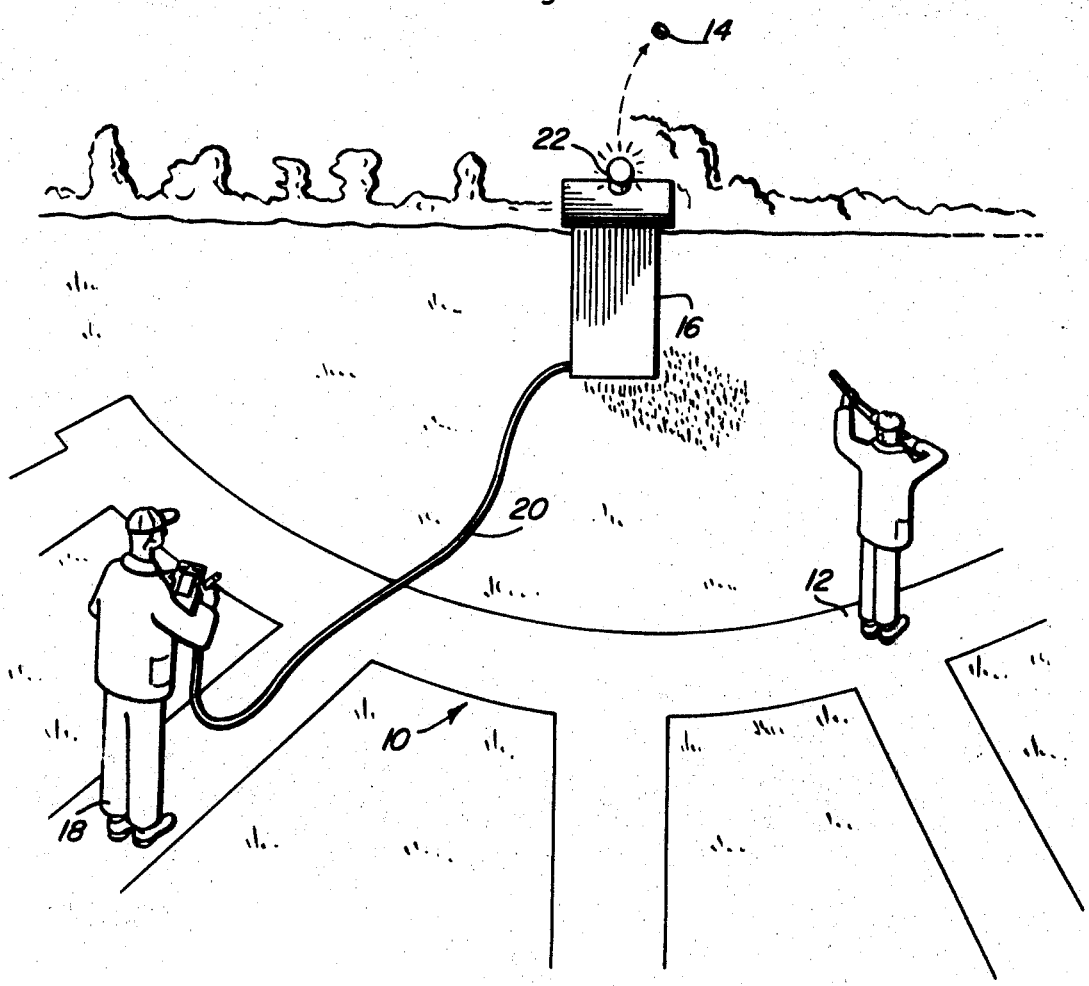
FIG. 1 is a diagrammatic view illustrating a typical trap field layout with a trap house being provided with an indicating light to signal to the shooter when a time delay interval has been initiated.

Referring now, more particularly to FIG. 1, a typical trap shooting field is illustrated including a walkway generally indicated by the numeral 10 with a plurality of shooting stations 12 from which a shooter aims upon successive shots. A clay pigeon or similar target 14, is projected into the air by a conventional trap release mechanism, not illustrated. Preferably, the trap release mechanism is located in a trap house such as that indicated at 16 provided with a window (not illustrated) through which the pigeon is projected. Any one of several automatic electrical trap release mechanisms may be utilized with the present invention. Preferably, such is controlled from the shooting location by a scorekeeper indicated at 18 who controls the assembly by way of a cable 20 connected to the trap release mechanism.

As explained above, it is an object of the present invention to provide a signal to each shooter to indicate the initiation of a time delay interval just prior to release of a clay pigeon. Preferably, this signal is provided by way of an electrically operated light 20 mounted on top of the trap house 16, or within the near vicinity thereof and within the shooter's field of vision. Each shooter is made aware of the initiation of the time delay interval either by energization or de-energization of the signal light. The time delay interval is pre-set such that the shooters quickly become accustomed to the time delay with a minimum amount of practice. Most important is the fact that each shooter has an equal opportunity to develop his timing skills to most accurately determine release of each clay pigeon. Control over the initiation of each timing cycle is maintained by the scorekeeper and means is also provided for preventing release of a clay pigeon even though the time delay interval has been initiated.

Figure 2:
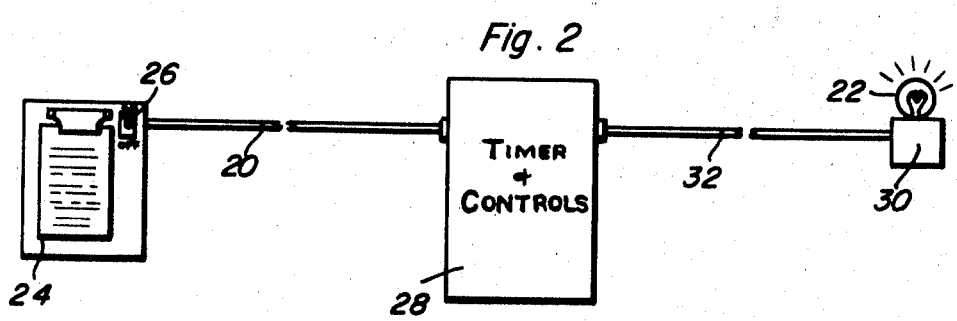
FIG. 2 is a diagrammatic view of the control assembly of the present invention.

Referring now, to FIG. 2, it will be appreciated that the scorekeeper is provided with a scoreboard 24 which may be either carried by the scorekeeper or mounted upon a pedestal or similar means, not illustrated. An "on-off" toggle switch 26 is mounted to the scoreboard for convenient operation by the scorekeeper and is connected to the timer and controls 28, preferably located in the trap house. The electrical lamp 22 is mounted in a conventional fixture 30 which, in turn, is connected to the timer and controls by way of a cable 32.

Figure 3:
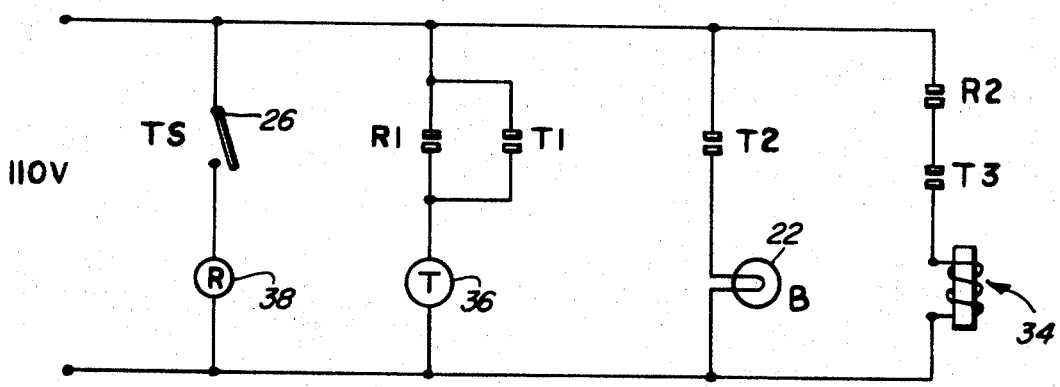
FIG. 3 is a schematic electrical diagram of the circuitry associated with the control assembly of the present invention.

Referring to FIG. 3, the circuitry associated with the control assembly of the present invention may be seen in more detail and includes a source of current such as 110 VAC which provides energy to a solenoid 34 associated with the trap release mechanism. The trap release mechanism is such that energization of solenoid 34 is effective to release the trap to project the clay pigeon or target from the trap house. Energization of the solenoid is achieved through operation of a timer 36 and control relay 38. Operation of the controls may be explained as follows. Closure of toggle switch 26 is effective to energize control relay 38 which, in turn, closes normally open switch contacts R1 and R2. Closure of contacts R1 is effective to energize timer 36 to initiate a timing cycle. The timer is provided with three switching contacts, T1, T2, and T3 which are operated sequentially to achieve the desired switching results in a manner hereinafter explained. Contacts T1 are in parallel with contacts R1 and are controlled such that, shortly after initiation of a timing cycle, their closure is effected to provide an electrical interlock for timer 36.

The timing function is further arranged such that the normally opened contacts T2 are closed a few seconds after initiation of the timing cycle to energize the indicating lamp 22 for observation by the shooter. Upon completion of a predetermined time delay interval after the light has been energized, the timer is effective to close the normally opened contacts T3 for energization of the trap release solenoid 34 through the relay switch contacts R2. It should be noted that the time delay interval is preset by the timer such that it is the same for each operation, whereby the shooters quickly become accustomed to the release after the signal to provide a fair release every turn for each shooter.

It will be appreciated that the timer may be arranged to provide for the trap release either after the light has turned on or after the light has turned off, whichever is most desirable to the shooters.

It will be appreciated that in order for the trap release solenoid to be energized, it is necessary that relay 38 remain in the circuit when the time delay interval has been completed. Thus, it is possible for the scorekeeper to prevent release of a clay pigeon even after the timing cycle has been initiated by merely opening toggle switch 26. This, in turn, de-energizes relay 38 and opens switch contacts R2 to prevent energization of the trap release solenoid. It will also be appreciated that even though toggle switch 26 has been opened, the timer 36 continues to advance since it is energized through the interlock contact T1.

It should be noted that solid state components may be substituted for the electromechanical relay and timer illustrated in the drawings.

Figure 4:
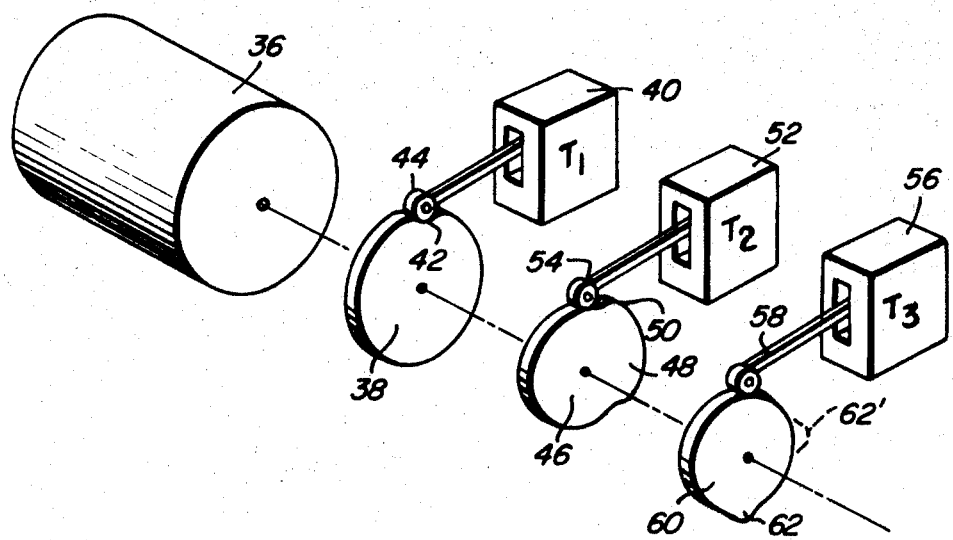
FIG. 4 is a simplified perspective view of a typical timing mechanism associated with the control assembly of the present invention.

Referring to FIG. 4, operation of the timer associated with the control assembly of the present invention may be more fully appreciated. Preferably, the control assembly utilizes a motor-driven, multiple cam type timer, such as that illustrated. However, other well-known timers, including the solid state types, may be utilized, if desired. A plurality of timing cams are operatively driven by a timing motor indicated at 36 to achieve the timing functions described above. Preferably, the cams are mounted on a common shaft. However, this is not essential so long as the cams are advanced in synchronism. A first timing cam 38 is adapted to actuate a first microswitch 40 provided with the normally open contacts T1. Cam 38 is provided with a lobe which extends substantially around the entire circumference with the exception of a relatively small angular portion which is indented with respect to the lobe as indicated at 42. A cam follower 44 associated with microswitch 40 is effective to close contacts T1 when engaging the lobe surfaces. Thus, momentary advancement of the timer motor by closure of toggle switch 26 is effective to advance cam 38 and close contacts T1, thereby interlocking the timer motor for completion of an entire timing cycle. A second cam 46 is provided with a lobe surface 48 with a leading edge 50 angularly displaced from indentation 42. A second microswitch 52, including contacts T2, is provided with a cam follower 54 which is effective to close the contacts when in engagement with the lobe surfaces. Thus, contacts T2 are closed shortly after closure of contacts T1 and are effective to energize the signal lamp 22.

Contacts T3 are contained in a third mircoswitch 56 provided with a cam follower 58 in engagement with a third timing cam 60 having a lobe 62 with a leading edge angularly spaced from leading edge 50 associated with cam 46. Engagement of the cam follower 58 with lobe 62 effects closure of contacts T3, thereby energizing the the trap release solenoid 34 with relay contacts R2 closed. If lobe 62 is angularly spaced from the trailing edge of cam lobe 48, release of the trap will occur a predetermined time interval after the signal light is de-energized. If release is desired upon completion of a time interval after the light is energized, the lobe associated with cam 60 is angularly positioned between the leading and trailing edges of lobe 48, such as indicated at 62'.

From the foregoing description it will be appreciated that the trap release control assembly of the present invention provides a unique means of signalling to each shooter at a predetermined time interval prior to release of the trap, such that each shooter will be exposed to identically timed conditions, thereby providing the ultimate fairness to all of the competitors. Furthermore, the circuitry is relatively simple in nature and inexpensive to manufacture, yet includes safety means to prevent release of the trap in the event that such is found necessary. Of course, minor changes in the circuitry or the components utilized therein are deemed to fall within the scope of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A control assembly for timed operation of a target trap to provide a ready signal to a shooter and automatically release the trap in response to completion of a predetermined time interval, said assembly comprising a source of current, electrically operated means for releasing the trap, signal means providing a ready signal to a shooter for indicating that the trap is to be released upon completion of a predetermined time delay interval, timer means for producing first and second time signals separated by said predetermined time delay interval, said first signal being effective to connect said signal means with said source of current, said second signal being effective to energize said trap release means, and switch means for selectively connecting said timer means to said source of current to initiate a timed cycle.

2. The assembly set forth in claim 1 wherein said switch means includes electrical relay means with a first normally opened relay switch, and said timer means includes an electrically operated timer in series with said first normally opened relay switch and said source of current.

3. The assembly set forth in claim 2 wherein said timer includes a plurality of time controlled switches, a first one of said time controlled switches being normally opened and in series with said signal means and said current source, a second one of said time controlled switches being normally opened and in series with said trap release means and said current source and being closed upon completion of said predetermined time delay interval.

4. The assembly set forth in claim 3 wherein said timer further includes a third time controlled switch which is normally opened and is in parallel with said first relay switch to maintain connection of said timer with said current source until completion of said timed cycle.

5. The assembly set forth in claim 4 wherein said switch means includes manual switch means for selectively connecting said relay with said current source to initiate said timed cycle, said relay means including a second normally opened relay switch in series with said second normally opened time controlled switch and said trap release means.

6. The assembly set forth in claim 1 wherein said switch means includes relay means for selectively preventing energization of said trap release means without de-energizing said timer means or interrupting said timed cycle.

7. The assembly set forth in claim 6 wherein said timer means includes a timer motor and a plurality of timing cams driven by said motor and a plurality of timer switches operatively connected to said cams for actuation thereby.

8. The assembly set forth in claim 7 wherein a first one of said cams is provided with a first switch actuating lobe around nearly its entire perimeter except for a cycle completion indentation, a second one of said cams being provided with a signal lobe with a leading edge angularly spaced from said indentation to effect energization of said signal means, and a third one of said cams being provided with a trap release lobe with a leading edge angularly spaced from the leading edge of said signal lobe to effect energization of said trap release means.

9. A trap release system for automatic timed release of a target trap upon completion of a predetermined time delay interval after energization of a ready signal located within a shooter's field of perception, said system comprising a current source, means for releasing the target trap, signal means located in the vicinity of said trap release means and within the shooter's field of perception to provide a signal indicative of the initiation of said predetermined time delay interval, timer means for initiating first and second time signals separated by said predetermined time delay interval, said first signal being effective to actuate said signal means by said current source and said second signal being effective to actuate said trap release means, and switch means for selectively connecting said timer means to said current source to initiate a timed cycle.

10. The system set forth in claim 9 wherein said signal means includes an electric light connected to said current source through said timer means.

11. The system set forth in claim 10 wherein said switch means includes relay means for selectively preventing energization of said trap release means without de-energizing said timer means or interrupting said timed cycle.

12. The system set forth in claim 11 wherein said timer means includes a timer motor and a plurality of timing cams driven by said motor and a plurality of timer switches operatively connected to said cams for actuation thereby.

13. The system set forth in claim 12 wherein a first one of said cams is provided with a first switch actuating lobe around nearly its entire perimeter except for a cycle completion indentation, a second one of said cams being provided with a signal lobe with a leading edge angularly spaced from said indentation to effect energization of said signal means, and a third one of said cams being provided with a trap release lobe with a leading edge angularly spaced from the leading edge of said signal lobe to effect energization of said trap release means.

* * * * *